(12) United States Patent
Chau (10) Patent No.: US 7,427,355 B2
(45) Date of Patent: Sep. 23, 2008

(54) WATER TREATMENT UNIT FOR BOTTLE OR PITCHER

(76) Inventor: Yiu Chau Chau, 80 W. Beaver Rd., Unit 14, Richmond Hills, Ontario (CA) L4B 1H3

( * ) Notice: Subject to any disclaimer, the term of this patent is extended or adjusted under 35 U.S.C. 154(b) by 303 days.

(21) Appl. No.: 10/846,238

(22) Filed: May 14, 2004

(65) Prior Publication Data

US 2005/0252844 A1 Nov. 17, 2005

(51) Int. Cl.
| | |
|---|---|
| B01D 27/02 | (2006.01) |
| B01D 27/14 | (2006.01) |
| C02F 9/02 | (2006.01) |
| C02F 1/50 | (2006.01) |
| C02F 1/28 | (2006.01) |
| B03C 1/02 | (2006.01) |
| B03C 1/30 | (2006.01) |

(52) U.S. Cl. .................... 210/266; 210/223; 210/282
(58) Field of Classification Search ................ 210/266, 210/282, 223
See application file for complete search history.

(56) References Cited

U.S. PATENT DOCUMENTS

| | | | |
|---|---|---|---|
| 171,056 A | 12/1875 | Sinclaire | |
| 4,695,379 A | 9/1987 | Nohren et al. | |
| 4,711,723 A * | 12/1987 | Bray .......................... | 210/652 |
| 4,769,144 A | 9/1988 | Nohren, Jr. | |
| 4,979,654 A | 12/1990 | Nohren, Jr. | |
| 4,986,901 A | 1/1991 | Nohren, Jr. et al. | |
| 5,017,286 A * | 5/1991 | Heiligman .................. | 210/266 |
| 5,041,219 A * | 8/1991 | Strand et al. ................ | 210/284 |
| 5,045,195 A | 9/1991 | Spangrud et al. | |
| 5,092,993 A * | 3/1992 | Goodwin ..................... | 210/202 |
| 5,156,335 A * | 10/1992 | Smith et al. ................... | 239/33 |
| 5,211,973 A | 5/1993 | Nohren, Jr. | |
| 5,269,919 A * | 12/1993 | von Medlin .................. | 210/256 |
| 5,340,478 A * | 8/1994 | Strand et al. ................ | 210/284 |
| 5,510,027 A * | 4/1996 | Tejeda ......................... | 210/282 |
| 5,545,315 A | 8/1996 | Lonneman | |
| 5,562,824 A | 10/1996 | Magnusson | |
| 5,609,759 A | 3/1997 | Nohren, Jr. et al. | |
| 5,628,900 A | 5/1997 | Naito | |
| 5,653,878 A | 8/1997 | Reid | |
| 5,795,471 A | 8/1998 | Naito | |
| 5,840,185 A | 11/1998 | Hughes et al. | |
| 5,851,388 A * | 12/1998 | Suh ........................ | 210/257.2 |
| 5,914,045 A | 6/1999 | Palmer et al. | |
| 5,928,512 A | 7/1999 | Hatch et al. | |
| 6,004,460 A | 12/1999 | Palmer et al. | |

(Continued)

FOREIGN PATENT DOCUMENTS

WO 01/49612 A1 * 7/2001

*Primary Examiner*—Thomas M Lithgow
(74) *Attorney, Agent, or Firm*—Cook Alex Ltd.

(57) ABSTRACT

A water treatment unit for positioning in a sport bottle or container for treating water includes a prefilter section, a pretreatment section, a treatment section and a post treatment section. A first chamber in the pretreatment section contains a first treatment medium which comprises at least one loose particulate medium through which the water to be treated flows in a vertical upward direction during treatment to lift the medium. A second chamber in the treatment section contains a second treatment medium through which the treated water flows in a radial horizontal direction during treatment. And a third chamber in the post treatment section contains a third treatment medium through which the water to be treated flows during treatment.

28 Claims, 6 Drawing Sheets

U.S. PATENT DOCUMENTS

| | | | |
|---|---|---|---|
| 6,042,729 A * | 3/2000 | Chau | 210/661 |
| 6,117,319 A | 9/2000 | Cranshaw | |
| 6,132,611 A * | 10/2000 | Yuen | 210/266 |
| 6,136,189 A | 10/2000 | Smith et al. | |
| 6,153,096 A | 11/2000 | Nohren, Jr. | |
| 6,165,362 A | 12/2000 | Nohren, Jr. et al. | |
| 6,193,886 B1 | 2/2001 | Nohren, Jr. | |
| 6,197,193 B1 * | 3/2001 | Archer | 210/266 |
| 6,200,471 B1 | 3/2001 | Nohren, Jr. | |
| 6,221,416 B1 | 4/2001 | Nohren, Jr. | |
| 6,231,763 B1 | 5/2001 | Chau | |
| 6,277,284 B1 | 8/2001 | Nohren | |
| 6,395,170 B1 | 5/2002 | Hughes et al. | |
| 6,468,435 B1 | 10/2002 | Hughes et al. | |
| 6,523,711 B1 | 2/2003 | Hughes et al. | |
| 6,569,329 B1 | 5/2003 | Nohren, Jr. | |
| 2003/0159979 A1 | 8/2003 | Chau | |

* cited by examiner

WATER TREATMENT UNIT FOR BOTTLE OR PITCHER

BACKGROUND AND SUMMARY OF THE INVENTION

The present invention is directed to a water treatment unit for the treatment of water contained in a water bottle, such as a sport bottle, or a container for the treatment of water, such as a pitcher.

Carbon has been used extensively in water treatment for the purification of water. However, the growth of bacteria in the carbon is always a concern. Moreover, the presence of chlorine in the water shortens the life of the carbon.

Various materials have been employed in the past to pretreat the water before it is treated by the carbon to reduce the possibility of growth of bacteria and/or remove or reduce the chlorine content in the water. For example, in Heskett U.S. Pat. No. 5,415,770 it is disclosed that the use of certain finely divided metals, such as alloys of copper and zinc, may be used to pretreat water to remove chemical constituents including residual chlorine and to kill bacteria as a pretreatment prior to treatment with carbon and/or other water treatment materials. However, pretreatment of the water in a carbon water treatment unit employed in, for example a sport water bottle, is generally difficult due to the restrictions on size of the treatment unit and/or the low water pressures encountered in such units. Size presents a problem simply due to the fact that it is difficult to provide multiple treatment chambers which are of a size to contain a sufficient amount of treatment medium in such relatively small units. Water pressure presents a problem due to the fact that it may be difficult to force the water through the treatment medium which, for example, because of size restrictions presents a small cross sectional area resulting in greater pressure drops.

It would also be desirable to provide a magnetic post treatment to the water such as disclosed in Naito U.S. Pat. No. 5,628,900. However, again due to the size restrictions encountered in a water treatment unit used in, for example a sport water bottle, such post treatment is difficult to achieve.

An additional problem is presented to the use of a water treatment unit in a sport water bottle because of the need to equalize the pressure in the bottle after treated water has been discharged from the bottle. In Hughes et al. U.S. Pat. No. 5,840,185 and Cranshaw U.S. Pat. No. 6,117,319 air passes into a sport bottle through the water filter to replace the water which has been treated and discharged from the bottle. However, because the air must pass through the filter medium, its passage is slowed and recovery of the bottle is retarded.

In the present invention a water treatment unit is provided in which the water can be pretreated before passage to a carbon block treatment medium with a loose particulate treatment medium to kill bacteria and remove chlorine and other contaminates from the water. Moreover, the water treatment unit of the present invention is also capable of post treatment of the water utilizing magnetic and other water treatments. Notwithstanding the ability to both pretreat and post treat the water in the present invention, the water treatment unit is still capable of a size which may be readily accommodated in a sport water bottle or the like and without experiencing unacceptable pressure drops across the various water treatment media either individually or collectively. And, the water treatment unit of the present invention when employed in a sport water bottle permits rapid venting of the bottle and recovery during use because the replacement air need not pass through the water treatment unit or media.

In one principal aspect of the present invention, a water treatment unit is provided for positioning in a container to treat water in the container which flows through the unit. The unit comprises an inlet for introducing water to be treated to the unit and a first chamber contains a first treatment medium, the first treatment medium comprising a substantially loose particulate medium through which the water to be treated flows in a substantially vertical direction during treatment. A second chamber contains a second treatment medium through which the water to be treated flows in a radial substantially horizontal direction during treatment, and an outlet is provided for discharging water which has been treated from the unit. The water flows from the inlet, through the first treatment medium, through the second treatment medium and from the outlet during treatment.

In another principal aspect of the present invention, the vertical flow through the first treatment unit is upward during the treatment to lift the substantially loose particulate medium.

In still another principal aspect of the present invention, the area of the first treatment medium is substantially less than the area of the second treatment medium.

In still another principal aspect of the present invention, the first treatment medium is one or more materials selected form the group consisting essentially of a metal which is preferably an alloy of copper and zinc, taicho and bakuhan.

In still another principal aspect of the present invention, the second treatment medium is a hollow block of carbon.

In still another principal aspect of the present invention, the unit includes a third chamber containing a third treatment medium through which the water to be treated flows during treatment.

In still another principal aspect of the present invention, the flow through the third treatment medium is also in a substantially vertical direction during treatment.

In still another principal aspect of the present invention, the third treatment medium includes one or more materials selected from the group consisting essentially of a magnet, magnetizable particles, a filter, quartz particles, ceramic particles, taicho particles and bakuhan particles.

In still another principal aspect of the present invention, a water bottle defines the container for holding the water to be treated and contains the aforementioned water treatment unit. The water bottle includes a bottom, and a top having a discharge for discharging the water from the bottle. The water treatment unit is located adjacent the bottom of the water bottle, and a conduit connects the outlet of the unit to the discharge of the water bottle, whereby water in the water bottle during treatment flows in sequence into the inlet of the unit, through the first, second and third water treatment media, through the outlet of the unit, through the conduit, and is discharged from the discharge of the water bottle.

In still another principal aspect of the present invention, a water bottle defines the container for holding the water to be treated and contains the aforementioned water treatment unit. The water bottle includes a bottom, and a top having a discharge for discharging the water from the bottle. The water treatment unit is located adjacent the top of the water bottle whereby the water in the water bottle during treatment flows in sequence into the inlet of the unit, through the first, second and third water treatment media, through the outlet of the unit, and is discharged from the discharge of the water bottle.

In still another principal aspect of the present invention, an air vent is positioned adjacent the top of the water bottle to equalize the pressure of the water in the bottle during treatment and bypassing the media.

In still another principal aspect of the present invention, a container for the treatment of water contains the aforementioned water treatment unit. The container includes an untreated water storage chamber to which the inlet of the treatment unit communicates, a treated water storage chamber to which the outlet of the treatment unit communicates, and a discharge for discharging the treated water from the treated water storage chamber.

These and other objects, features and advantages of the present invention will be more clearly understood upon consideration of the following detailed description.

BRIEF DESCRIPTION OF THE DRAWINGS

In the course of this description, reference will frequently be made to the attached drawings in which.

DESCRIPTION OF THE PREFERRED EMBODIMENTS

Figure 1:
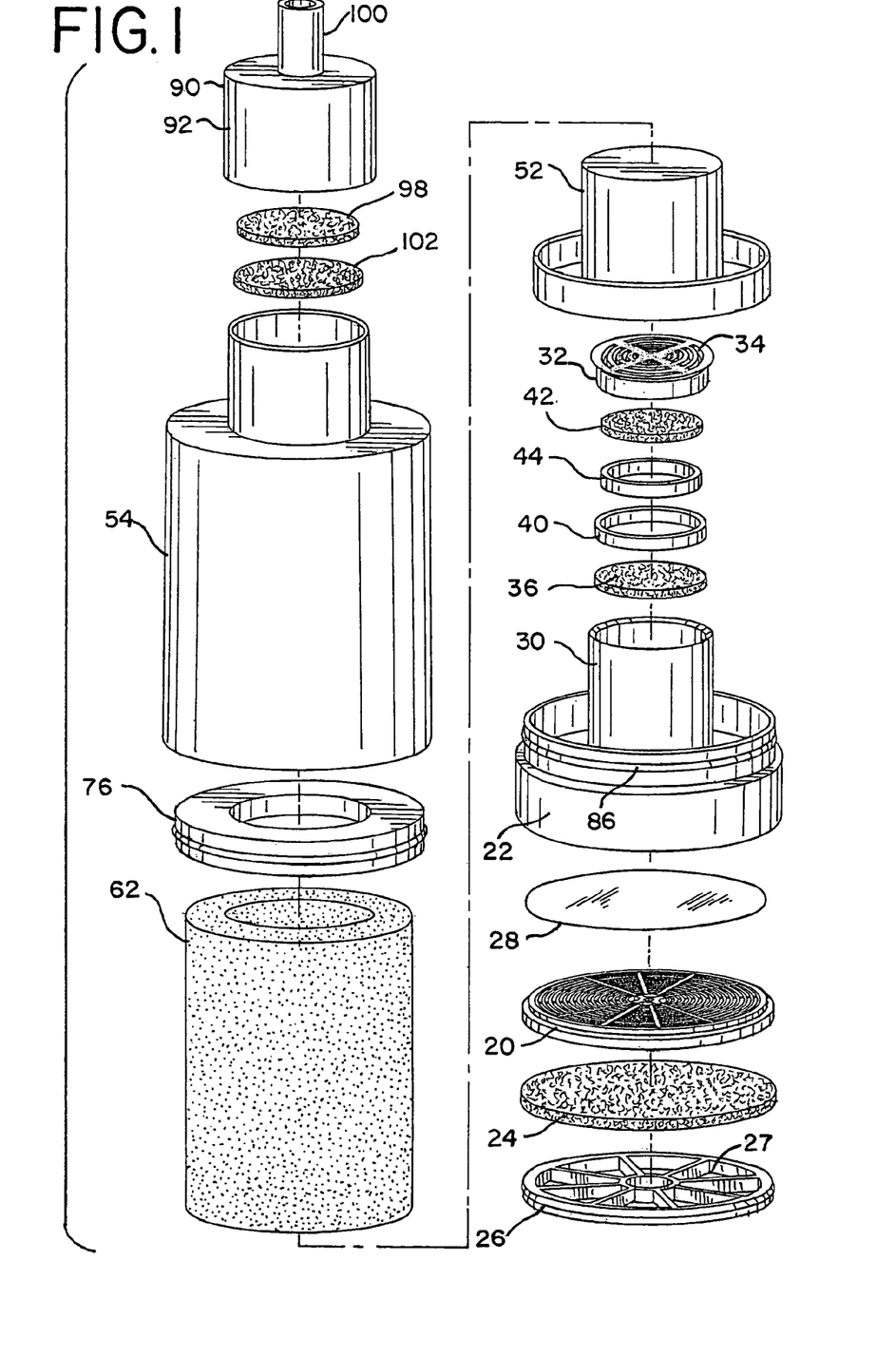
FIG. 1 is an exploded view of a preferred embodiment of water treatment unit of the present invention.
Figure 2:
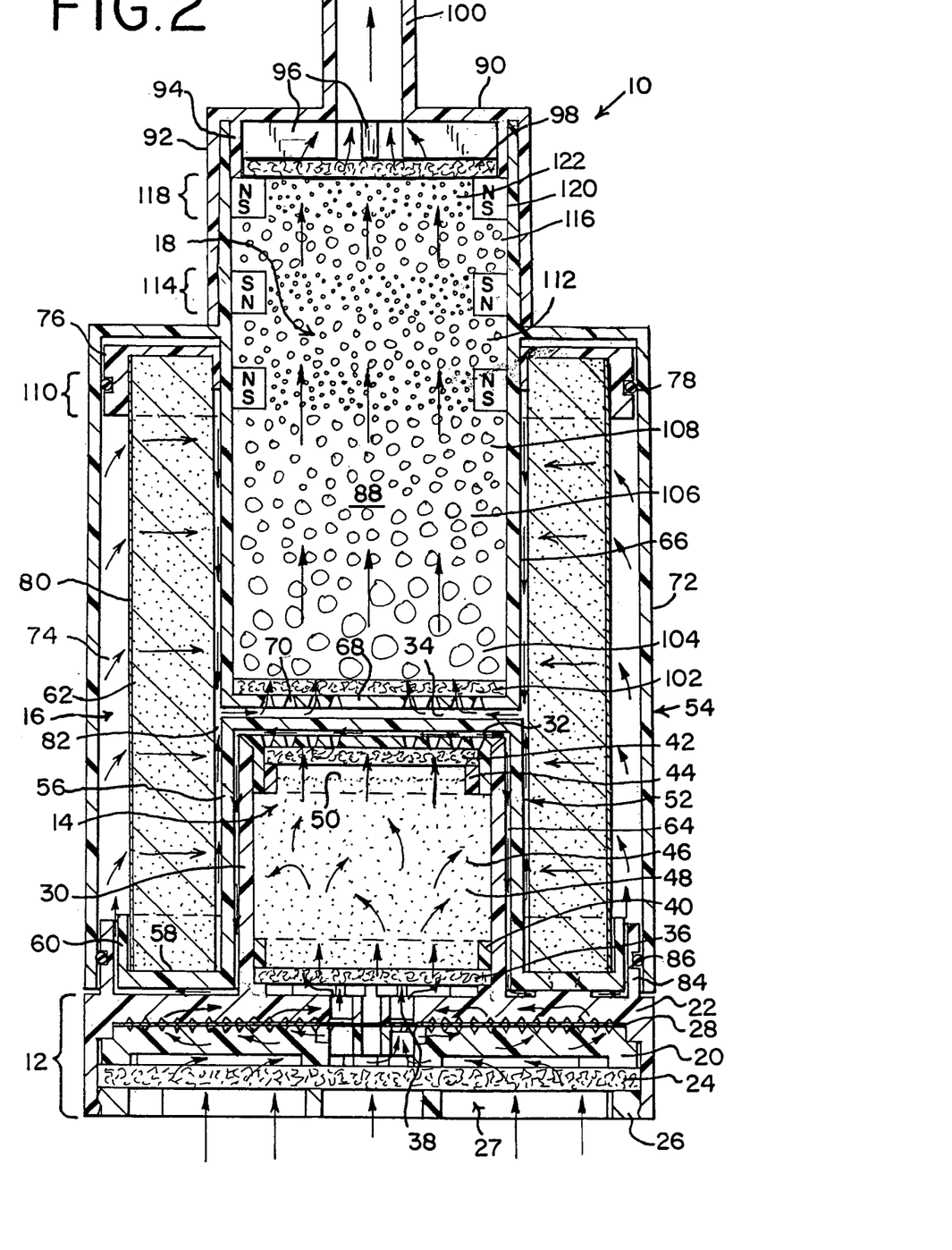
FIG. 2 is a cross sectioned side elevation view of the water treatment unit shown in FIG. 1 and which has been assembled.
Figure 3:
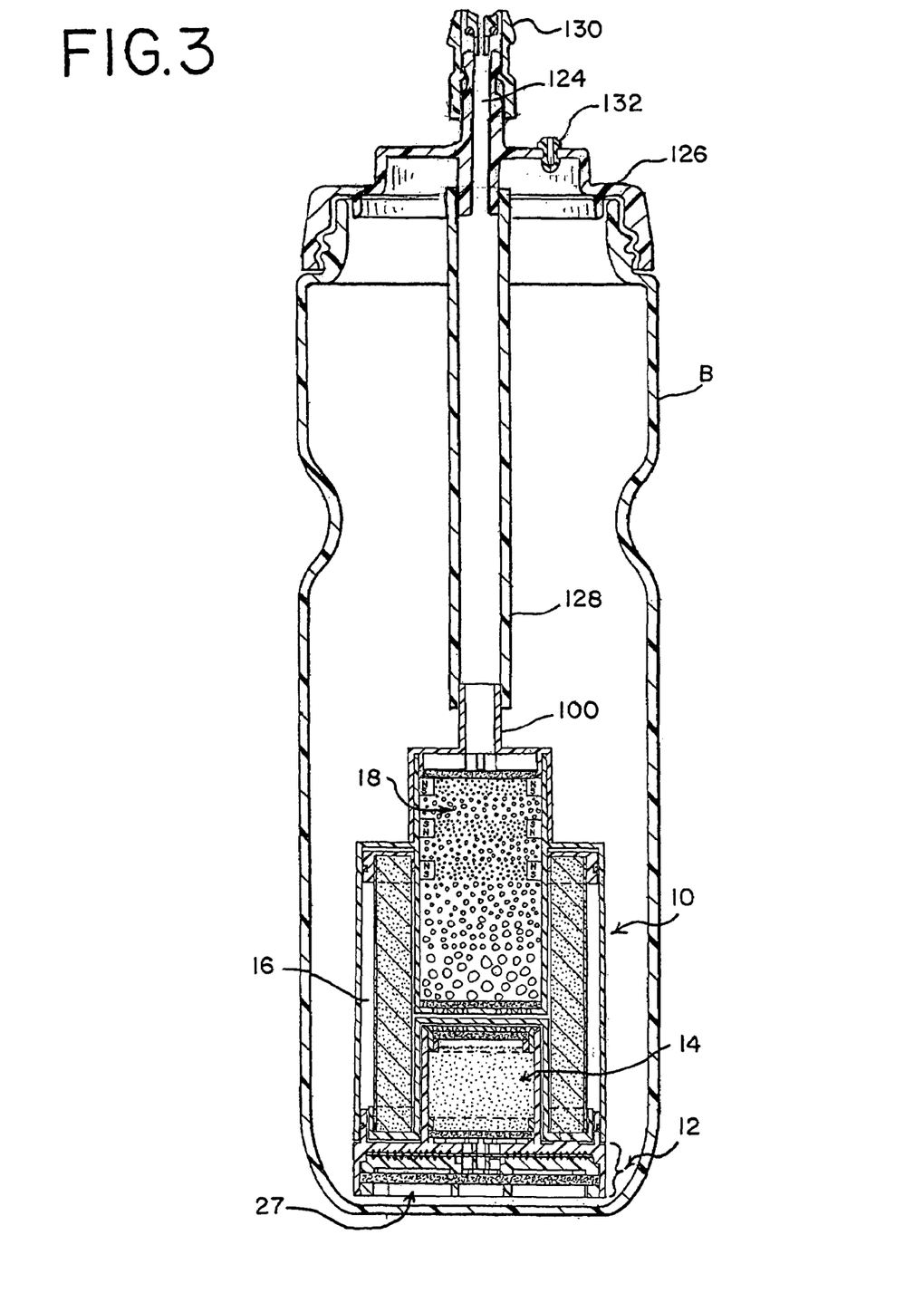
FIG. 3 is a cross sectioned side elevation view of a sport water bottle in which the water treatment unit of FIG. 2 has been positioned toward the bottom of the bottle, and in which the bottle is shown in the open condition.

With particular reference to FIGS. 1-3, one preferred embodiment of water treatment unit 10 of the present invention is shown. The water treatment unit 10 in general comprises a prefilter section 12, a pretreatment section 14, a treatment section 16 and a post treatment section 18.

The prefilter section 12 comprises a filter holder 20 and base 22. A filter 24 is positioned upwardly as shown in FIG. 2 against the bottom side of the base 22, and a filter holder 26 having openings therethrough which define an inlet 27 to the unit 10 is positioned against the bottom side of the filter 24 to hold the filter 24 in place. The filter 24 preferably has a pore size of about 10 μm. The filter holder 26 may be held in place by a snap fit into the bottom of the prefilter section 12 as shown in FIG. 2.

A fine membrane filter film 28 is positioned on top of the filter holder 20 and beneath the base 22. Filter film 28 has the purpose of retaining extremely fine particulate contaminants and/or bacteria before further treatment in the water treatment unit 10. The film 28 preferably has a fine pore size of about 3-5 μm.

The pretreatment section 14 comprises an annular sleeve 30 which extends upwardly from the top side of the base 22. The annular sleeve 30 is capped at the top by a cap 32 which has openings 34 therethrough to permit passage of the water through the cap. The annular sleeve 30 is preferably formed integrally with the base 22.

A filter 36 is positioned adjacent the bottom of the annular sleeve 30 and overlies the openings 38 though which water which has been treated by the filter film 28 passes to the pretreatment section 14. The filter 36 is held in place by a filter holder ring 40 and a second filter 42 is held against the underside of the cap 32 by a filter holder ring 44.

The annular sleeve 30 together with the base 22 and cap 32 thereby define a chamber 46. The chamber 46 preferably contains a loose particulate water treatment medium 48 which may, for example, be the particulate alloy of copper and zinc as described in the aforementioned U.S. Pat. No. 5,415,770. As previously discussed, such particulate metal alloy functions not only as a bactericide, but also removes chlorine and other containments from the water being treated before the water is treated in the subsequent treatment section 16 and post treatment section 18. The loose particulate water treatment medium 48 may also be taicho and/or bakuhan individually or together with each other and or with the aforementioned metal alloy. Taicho is a mineral stone which naturally conditions water to detoxify harmful microorganisms, organics and pesticides and inhibits algae growth in water and in the filter. Bakuhan stone stabilizes water pH and dissolved oxygen and enhances taste and adds trace amounts of magnesium while absorbing metals.

In the present invention the loose particulate treatment medium 48 preferably does not completely fill the chamber 46 when water is not flowing through the chamber as shown by the treatment medium level 50 in FIG. 2. This permits the water to lift the loose particulate treatment medium 48 when the water flows through the chamber 46 for treatment. However, the loose particulate treatment medium 48 is retained within the chamber 46 and prevented from passing through the openings 34 by the filter 42. This lifting of the loose particulate treatment medium 48 is important because even though the cross sectional area of the chamber 46 is relatively small which otherwise could result in a considerable pressure drop across the chamber, the pressure drop will be substantially reduced because of the looseness and lifting of the particulate treatment medium 48.

The filters 36 and 42 in the chamber 46 have the principal function of retaining the particulate medium 48 in the chamber. Accordingly, they may have a relatively large pore size for example on the order of 50 μm.

The treatment section 16 is of larger diameter and surrounds the pretreatment section 14 and post treatment section 18. It includes a generally hat shaped base 52 and a main body 54. The hat shaped base 52 generally includes a crown portion 56 which is closed at the top and a rim portion 58 with an annular flange 60 which is spaced from the crown portion 56 to present an annular recess into which the bottom of a hollow carbon block filter 62 is positioned as best seen in FIG. 2. The outer wall of the annular sleeve 30 and the cap 32 are spaced from the inner wall of the crown portion 56, and the rim portion 58 is spaced from the top of the upper base 22 to define a passage 64 for the flow of water which leaves the pretreatment section 14 and is enroute to the treatment section 16 as shown by the arrows in FIG. 2.

The main body 54 of the treatment section 16 comprises a first elongate tube 66 having a bottom 68 with openings 70 therethrough, and a second lagrer diameter elongate tube 72 is spaced from and surrounds the bottom portion of tube 66 to define a chamber 74 for containing a carbon block filter 62. An annular cover 76 is positioned at the top of chamber 74 to hold the upper end of the carbon block filter 62 and an o-ring 78 is positioned between the cover 76 and the inner wall of the elongate tube 72 to block any flow of water therebetween.

The exterior or upstream side of the carbon block filter 62 is preferably covered with an external membrane filter 80 as best seen in FIG. 2. As in the membrane filter film 28, the principal purpose of the external membrane filter 80 is to catch any bacteria that may have escaped the filter film 28 and pretreatment section 14. Accordingly it too preferably has a small pore size on the order of about 0.3-3 μm.

The internal diameter of the carbon block filter 62 is somewhat larger than the external diameter of the elongate tube 66 and crown 56 to provide a passage 82 for the flow of water which has passed through the carbon block filter 62 to the bottom 68 of the elongate tube 66.

When assembled, the bottom of the elongate tube 72 is sealed to an annular flange 84 which extends upwardly from the base 22 between the annular flange 60 and the bottom of the elongate tube 72 by an O-ring 86.

From the foregoing description it will be appreciated that the flow of water during treatment through the carbon block filter 62 and its external filter 80 is radially inward and substantially horizontal, and that the area of flow through these water treatment media is substantially larger than the area of flow through the loose particulate treatment medium 48. Thus, because of this direction of flow and substantially larger area, the amount of pressure drop which might otherwise be experienced through this relatively dense carbon block filter 62 water treatment medium and the very small pore external filter 80 is substantially reduced. Again, this is important when considering the preferred ultimate use of the water treatment medium under low pressure conditions.

Like the pretreatment section 14, the post treatment section 18 is also in principal part surrounded by the treatment section 16 and is in axial alignment with the pretreatment section 14. The post treatment section 18 includes a chamber 88 which is defined by the inner wall of the elongate tube 66, its bottom 68 and a cap 90 which fits over the top of the elongate tube 66. As best seen in FIG. 2, the cap 90 comprises a pair of spaced annular walls 92 and 94 which are spaced from each other so as to receive the upper end of the elongate tube 66. The underside of the cap 90 also includes several radially extending flanges 96 which extend downwardly into the chamber 88 and which function to hold a final discharge filter 98 in place. Finally, in the embodiment of water treatment unit shown in FIGS. 1-3, the cap 90 includes an elongate opening 100 therethrough, through which water which has been treated in the water treatment unit 10 is discharged.

A filter 102 is also positioned at the bottom 68 of the chamber 88 of the post treatment section 18. The filters 98 and 102 serve the principal purpose of retaining the particulate treatment materials in the chamber 88. Therefore they may have a relatively large pore size on the order of about 50 μm.

A layer of quartz particles 104 is then positioned on the filter 102 followed by a layer of taicho particles 106 and then a layer of bakuhan particles 108. The quartz particles 104 may be spheres of about 2-3 mm in diameter. The taicho 106 and bakuhan particles 108 may be of irregular shape and about 1-2 mm in size.

The Bakuhan layer 108 is next followed by a magnetic layer 110, a layer of ceramic particles 112, a magnetic layer 114, a layer of ceramic particles 116, and another magnetic layer 118 which is followed by the filter 98 to maintain the particles in the chamber 88 and prevent them from passing through the elongate opening 100 during treatment.

Each magnetic layer 110, 114 and 118 preferably comprises an annular magnet 120 and magnetite particles 122 which become magnetized by the annular magnet to extend the magnetic field across the width of the chamber 88 and strengthen it. The annular magnets 120 of adjacent magnetic layers 110, 112 and 118 are arranged with like polarities facing each other as shown in FIG. 2. The magnetic particles may be of irregular shape and about 1-2 mm in size. The magnetic field generation activates and restructures the water molecules as discussed in the aforementioned U.S. Pat. No. 5,628,900.

As shown in FIG. 3, the water treatment unit 10 as thus far described is shown positioned adjacent the bottom of a sport water bottle B. The elongate opening 100 at the top of the water treatment unit 10 is connected to the opening 124 in the cap 126 of the bottle with an elongate conduit such as a straw 128. The cap 126 preferably includes some form of valve, such as the slide valve 130, which is shown in the raised, open position in FIG. 3 and which, when closed, plugs the opening 124. The bottle B is preferably formed of a flexible material, such as plastic, so that when the bottle is squeezed water will be forced from the interior of the bottle B surrounding the unit through the inlet 27, the water treatment unit 10, the straw 128 and the opening 124.

The pressure in the bottle B is equalized by a venting check valve 132 in the cap 126. When the bottle B is squeezed, the check valve 132 closes and when it is relaxed the check valve 132 opens and air enters the bottle in bypassing relationship to the water treatment unit 10 to replace the water which has been removed from the bottle.

Although it is believed that the foregoing description is more than adequate for an understanding of the order and direction of flow of the water through the water treatment unit 10 during treatment, a flow description will follow.

When the bottle B is not in use, the slide valve 130 is moved downward to close and block the opening 124. In this condition no flow will occur through the treatment unit 10 and the loose particulate treatment medium 48 will settle to the bottom of chamber 46 as shown by the treatment medium level 50 in FIG. 2.

When it is desired to drink from the bottle B, the slide valve 130 is moved upward to open the opening 124 as seen in FIG. 3, and the bottle is squeezed by the user. When this occurs, water in the bottle will be forced to flow upward through the inlet 27 of the water treatment unit 10 and to its prefilter section 12.

In the prefilter section 12 the water will flow through the filter 24, the filter film 28 and the openings 38 to the underside of the filter 36 in the pretreatment section 14.

In the pretreatment section 14 the water will flow through the filter 36 and will flow substantially vertically upward in chamber 46 to lift the loose particulate treatment medium 48 from its settled condition to suspend the medium in the chamber 46. Thus, even though the cross sectional area of the chamber 46 is relatively small, any pressure drop across the loose particulate treatment medium 48 will be minimal because of the looseness and suspension of the medium. Moreover, because the cross sectional area of the chamber 46 is relatively small and the medium 48 is loose, channeling will be minimized. The water will then flow through filter 42, the latter of which retains the loose particulate treatment medium 48 in the chamber 46, and through the openings 34 in the cap 32, through the passage 64 and into the treatment section 16.

In the treatment section 16 the water will flow through external filter 80 and the carbon block filter 62 in a radial substantially horizontal manner as shown by the arrows in FIG. 2. Although the carbon block filter 62 is typically quite dense and the external filter has a very fine pore size, as might otherwise result in a substantial pressure drop across those filters, any such pressure drop is minimized by the substantially large area through which the water passes through the external filter 80 and carbon block filter 62. After the water passes through the carbon block filter 62 it flows through passage 82 to leave the treatment section 16 and enter the post treatment section 18 by passing through openings 70 in the bottom 68 of the elongate tube 66.

As the water emerges from openings 70, it passes substantially vertically upward through the filter 102, the layer of quartz particles 104, the layer of taicho particles 106, the layer of bakuhan particles 108, through the magnetic layer 110, the ceramic particle layer 112, the magnetic layer 114, the ceramic particle layer 116 and the magnetic layer 118. Finally, the water will pass through the filter 90 at the top of chamber 88 which retains the particles in the chamber. The water will then flow between the radial flanges 96 which retain the filter in the chamber, and through the elongate opening 100, the straw 128 as seen in FIG. 3 and the opening 124 of the bottle B.

The water which has been removed from the bottle B is rapidly replaced by air through the venting check valve 132 in the cap 126 when the bottle is relaxed without the need to pass through the water treatment unit 10. Thus, recovery of the bottle B is rapid.

Figure 4:
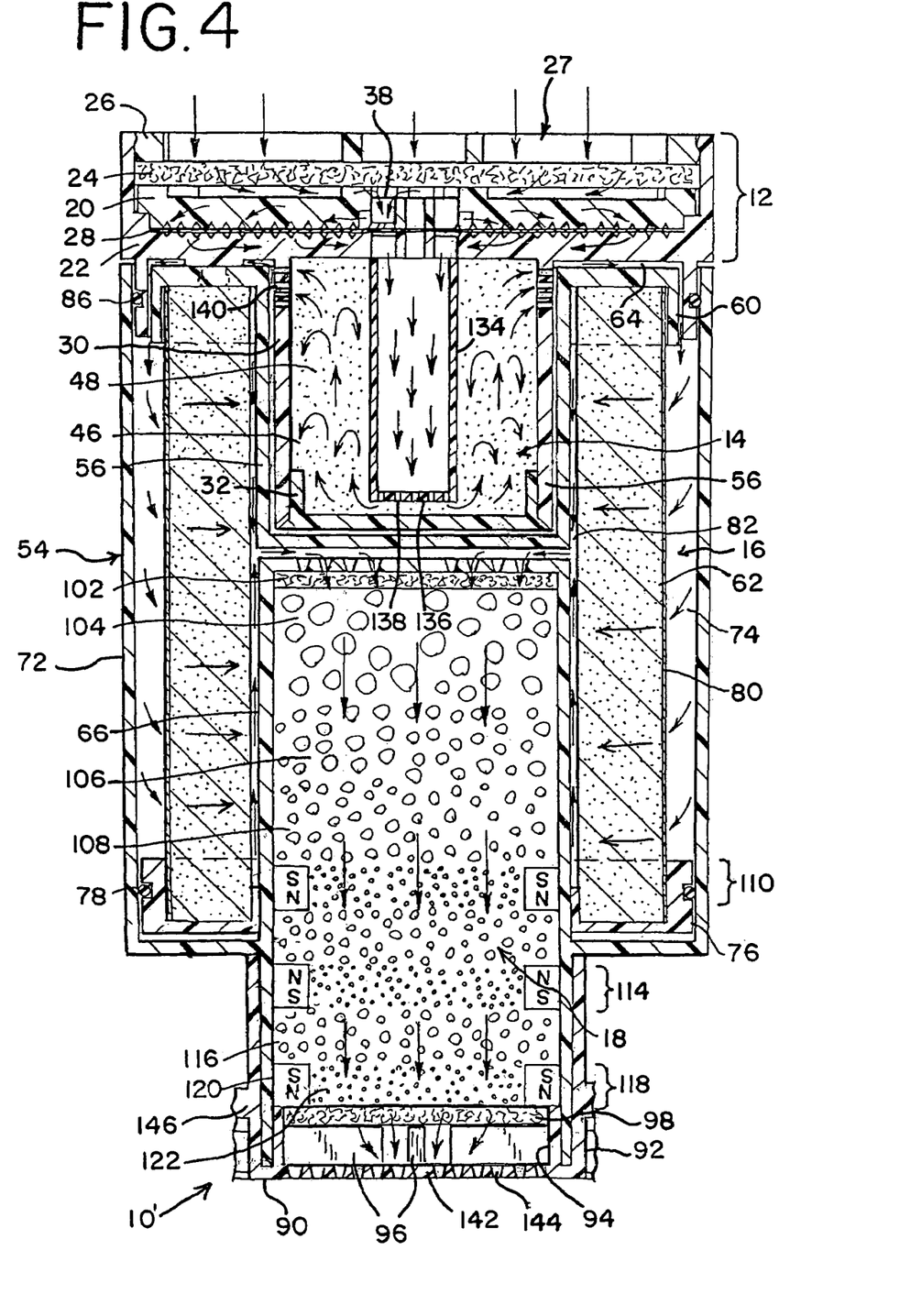
FIG. 4 is a cross sectioned side elevation view of a second preferred embodiment of water treatment unit of the present invention.
Figures 5, 5A:
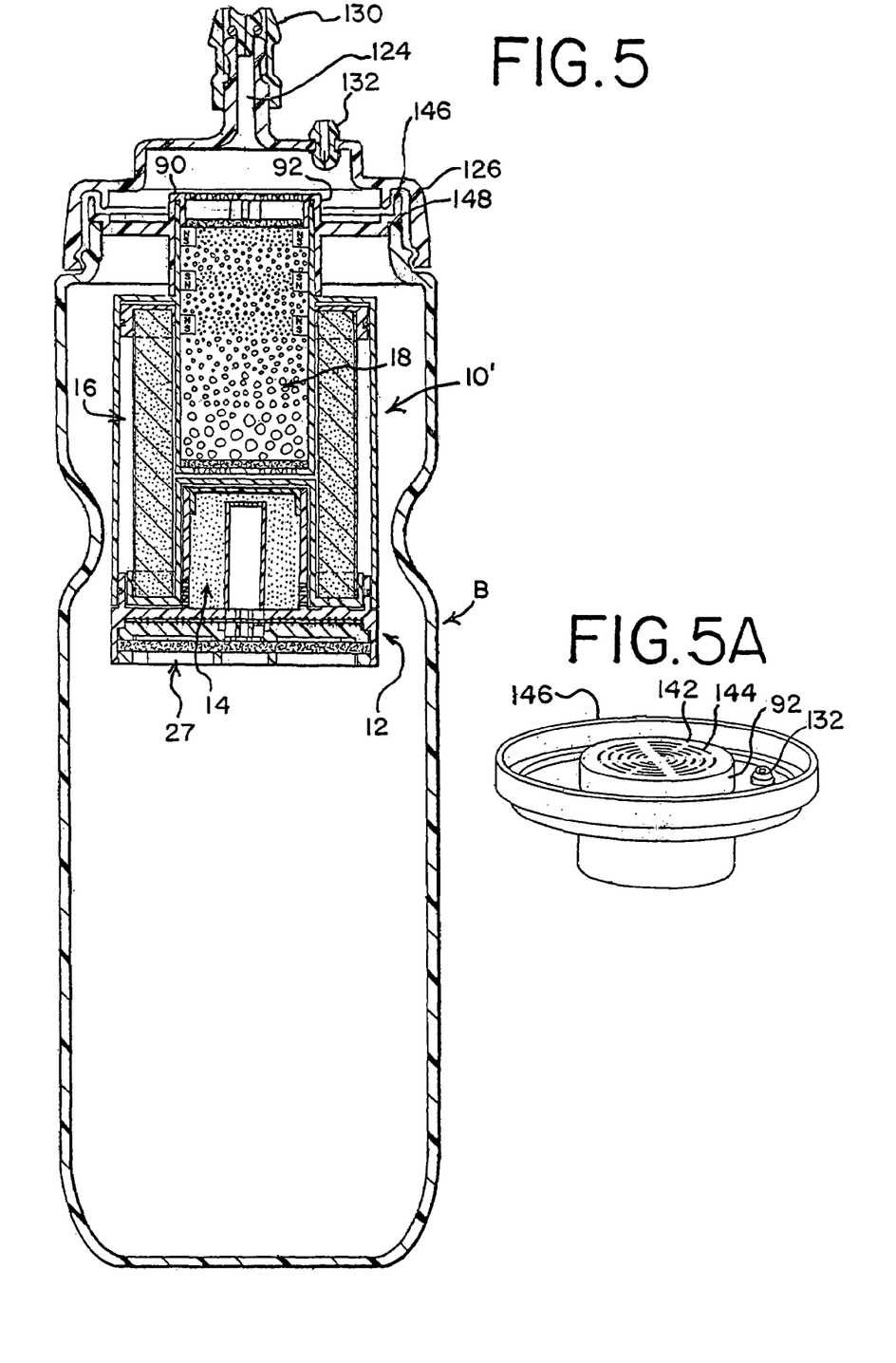
FIG. 5 is a cross sectioned side elevation view of a sport water bottle in which the water treatment unit of FIG. 4 has been positioned adjacent the top of the bottle, and in which the bottle is shown in the closed condition.
FIG. 5A is a perspective view of a flange for suspending the water treatment unit of the present invention adjacent the top of the sport water bottle as shown in FIG. 5 and also for venting the bottle during and after treatment of the water.

As shown in FIGS. 4 and 5, a second somewhat altered embodiment of water treatment unit 10' is shown positioned at the top rather than the bottom of the sport water bottle B. The two principal changes in the embodiment shown in FIGS. 4 and 5 from that shown in FIGS. 1-3 are in the pretreatment section 14 and at the discharge from the unit 10'. Because many of the components in the unit 10' are identical and unchanged from the unit 10 which has previously been described, like components have been assigned like reference numerals.

Because the unit 10' shown in FIG. 5 is located at the top of the bottle B, the bottle must be generally inverted in order to drink water from the bottle. The bottle cannot be simply squeezed as is the embodiment in FIGS. 1-3, (although it can also be squeezed as well as inverted) because the water level in the bottle B will soon drop below the level of the water treatment unit 10' and the unit will cease to function. Accordingly, the water treatment unit 10' is shown inverted 180° in FIG. 4 from the unit 10 shown in FIG. 2. It is this inverted position that it will generally assume during use and during water treatment.

Referring to FIG. 4, it will be seen that one of the changes in this embodiment is that an elongate tube 134 has been added to the side of the base 22 facing the chamber 46, and the end of the tube 134 contains a closure 136 having perforations 138 therethrough. The cap 32 does not include openings therethrough as in FIG. 2. Instead the annular sleeve 30 has also been modified to include openings 140 therethrough opposite the end of chamber 46 from the cap 32 and closure 136 to provide for the flow of fluid out of the chamber 46 as seen in FIG. 4 after it has flowed substantially vertically upward to lift the loose particulate treatment medium 48 as previously described.

The tube 134 permits upward flow through the bed of loose particulate treatment medium 48 when the bottle B is inverted for use. As previously discussed, this upward vertical flow through the loose particulate treatment medium 48 is important to substantially reduce the pressure drop across that medium.

The other principal change as seen in the embodiment shown in FIG. 4 is the elimination of the elongate opening 100 from the embodiment shown in FIG. 2 and replacement of that opening with a simple end closure 142 having openings 144 therethrough to permit the discharge of the water from the water treatment unit 10' to the opening 124 in the cap 126 of the bottle B.

The manner of mounting the top mounted water treatment unit 10' in FIG. 5 is also somewhat different than the bottom mounted unit 10 in FIG. 2. As shown in FIG. 5, a flange 146 is preferably formed integrally with the annular wall 92 of the cap 90. The flange 146 spans the opening 148 of the bottle B as seen in FIG. 5. Thus, the flange 146 and its water treatment unit 10' can be supported and firmly held in place simply by screwing the cover 130 of the bottle B onto the bottle to grasp the flange 146 between the cover and the top of the bottle opening 148. The flange 146 also preferably includes a vent check valve 132 as previously described to permit air to rapidly enter the bottle B without the need to pass through the water treatment unit 10' to equalize the pressure in the bottle as water is treated and removed.

Figure 6:
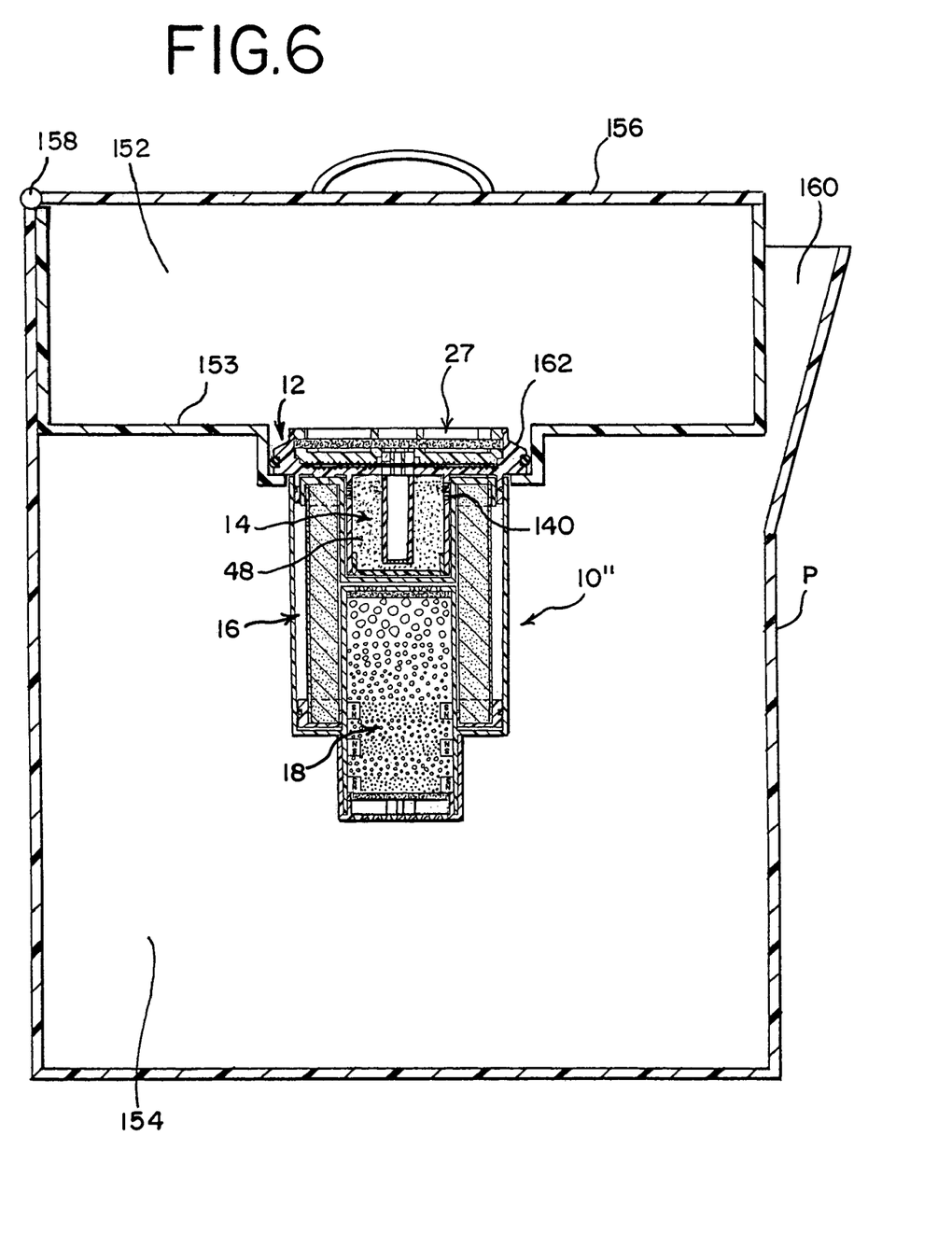
FIG. 6 is a cross sectioned side elevation view of a container for treatment of water in the form of a pitcher and in which a water treatment unit substantially as shown in FIG. 4 is positioned therein.

Referring to FIG. 6 still a third embodiment of water treatment unit 10" is shown positioned in a container for the treatment of water, such as a pitcher P.

The pitcher P includes an unfiltered water chamber 152 having a floor 153, and a filtered water chamber 154 beneath the floor 153. The water treatment unit 10" is suspended from the floor 153 as shown in FIG. 6 so that when water to be treated is poured into the unfiltered water chamber 152, it will flow by gravity through the treatment unit 10" and into the filtered water chamber 154 where it is stored until it is to be used.

The pitcher P also preferably includes a lid 156 which may be hinged at 158 to open and close to permit introduction of the water into chamber 152, and a spout 160 to permit dispensing of the filtered water from the filtered water chamber 154.

The only difference between the water treatment unit 10" shown in FIG. 6 and the water treatment unit 10' shown in FIGS. 4 and 5 is that the prefilter section 12 has been modified to include an annular flange 162 to support the water treatment unit 10" on the floor 153, and flange 146 as seen in FIGS. 4 and 5 has been removed from the discharge end of the water treatment unit. An O-ring 164 around the annular flange 162 prevents the undesired bypass of unfiltered water from the unfiltered water chamber 152 past the water treatment unit 10" to the filtered water chamber 154 without being treated.

An advantage of the continuously inverted positioning of the water treatment unit 10" in the pitcher P is that the loose particulate treatment medium 48 in the pretreatment section 14 is always wet due to the location of the openings 140. Thus, the particulate treatment medium 48 will not dry out and clump, and will always be maintained in a condition ready for use.

Upon consideration of the foregoing description it will be appreciated that the water treatment units of the present invention are capable of providing a compact small unit with the ability to accommodate two or more water treatment media without unacceptable pressure drop during treatment and are still capable of being contained in a relatively small container and operate under low pressures.

It should also be appreciated that the substantially vertical flow directions in the pretreatment section 14 and post treatment section 18 and the substantially horizontal flow direction in the treatment section 16 may angularly vary somewhat from the true vertical or horizontal depending upon the angle at which the bottle is held. What is important is that the flow is generally upward and/or radial as described and in contrast to each other.

It should also be appreciated that the components of the water treatment units 10, 10' and 10" may be separable to selectively replace or replenish any or all of the various treatment media because the respective media in the respective prefilter section 12, pretreatment section 14, treatment section 16 and post treatment section 18 are not layered with each other but instead are contained in separate components and chambers.

It will also be understood that the preferred embodiments of the present invention which have been described are merely illustrative of the principles of the present invention. Numerous modifications may be made by those skilled in the art without departing from the true spirit and scope of the invention.

I claim:

1. A water treatment unit for positioning in a container to treat water in the container which flows through the unit at low water pressure, the unit comprising:
   an elongated axis;
   an inlet for introducing water to be treated to the unit;
   a first chamber containing a first treatment medium which does not completely fill said first chamber when water is not flowing though the unit, said first treatment medium comprising a substantially loose particulate medium through which the water to be treated flows at low water pressure in a direction substantially parallel to said axis during treatment and which is lifted when the water flows through the unit at said low water pressure during treatment;
   a second chamber containing a second treatment medium though which the water to be treated flows in a direction substantially perpendicular to said axis at said low water pressure during treatment;
   a third chamber containing a third treatment medium through which the water to be treated flows during treatment, said third treatment medium including a magnetic field and at least one magnet and magnetizable particles;
   an outlet for discharging water which has been treated from the unit; and
   wherein the water flows from said inlet, through said first treatment medium, through said second treatment medium and from said outlet in that order and at said low water pressure during treatment.

2. A container for the treatment of water and containing the water treatment unit of claim 1, the container including an untreated water storage chamber to which the inlet of the treatment unit communicates, a treated water storage chamber to which the outlet of the treatment unit communicates, and a discharge for discharging the treated water from the treated water storage chamber.

3. A sport water bottle comprising:
   a container for holding and dispensing water;
   a water treatment unit in said container for treating the water in said container at a low water pressure, said water treatment unit including;
   an elongate axis;
   an inlet for introducing water to be treated in said container at said low pressure to the water treatment unit;
   a first chamber containing a first treatment medium which does not completely fill said first chamber when water is not flowing through the unit, said first treatment medium comprising a substantially loose particulate medium through which the water to be treated flows at said low water pressure in a direction substantially parallel to said axis during treatment and which is lifted when the water flows through the unit at said low water pressure during treatment;
   a second chamber containing a second treatment medium through which the water to be treated flows in a direction substantially perpendicular to said axis at said low water pressure during treatment;
   an outlet for discharging water which has been treated from the unit;
   wherein the water flows from said inlet, through said first treatment medium, through said second treatment medium and from said outlet in that order and at said low water pressure during treatment; and
   wherein said container is constructed to be manipulated manually to impart said low pressure to the water during treatment in said water treatment unit.

4. The water bottle of claim 3, wherein the area of said first treatment medium is substantially less than the area of said second treatment medium.

5. The water bottle of claim 3, wherein said first treatment medium is one or more materials selected from the group consisting essentially of a metal, taicho and bakuhan.

6. The water bottle of claim 5, wherein said second treatment medium is a hollow block of carbon.

7. The water bottle of claim 3, wherein said first treatment medium is an alloy of copper and zinc.

8. The water bottle of claim 3, wherein said second treatment medium is a hollow block of carbon.

9. The water bottle of claim 3, wherein said first treatment medium is one or more materials selected from the group consisting essentially of a particulate metal alloy of copper and zinc, taicho and bakuhan; and said second treatment medium is a hollow block of carbon.

10. The water bottle of claim 3, wherein said second chamber surrounds said first chamber.

11. The water bottle of claim 3, including a third chamber containing a third treatment medium though which the water to be treated flows during treatment.

12. The water bottle of claim 11, wherein the flow though the third treatment medium is in a direction substantially parallel to said axis during treatment.

13. The water bottle of claim 11, wherein said third treatment medium includes a magnetic field.

14. The water bottle of claim 13, wherein said third treatment medium includes at least one magnet and magnetizable particles.

15. The water bottle of claim 11, wherein said third treatment medium is one or more materials selected from the group consisting essentially of a magnet, magnetizable particles, a filter, quartz particles, ceramic particles, taicho particles and bakuhan particles.

16. The water bottle of claim 13, wherein said first treatment medium is one or more materials selected from the group consisting essentially of a metal alloy of copper and zinc, taicho and bakuhan; and said second treatment medium is a hollow block of carbon.

17. The water bottle of claim 3, wherein said container is constructed to be manipulated manually by inverting to impart said low pressure to the water during treatment in said water treatment unit.

18. The water bottle of claim 11, wherein the area of said first treatment medium is substantially less than the area of said second treatment medium.

19. The water bottle of claim 11, wherein said second chamber surrounds said first and third chambers.

20. The water bottle of claim 3, wherein said container holds the water to be treated at said low water pressure, the container including a bottom, and a top having a discharge for discharging the water from the bottle, said water treatment unit being located adjacent the bottom of said container, and a conduit connecting said outlet of said unit to said discharge of said container, whereby water at said low water pressure in said container during treatment flows in sequence into said inlet of said unit, through said first and second water treatment media, through said outlet of said unit, through said conduit, and is discharged from said discharge of the container.

21. The water bottle of claim 11, wherein said container holds the water to be treated at said low water pressure, the container including a bottom, and a top having a discharge for discharging the water from the bottle, said water treatment unit being located adjacent the bottom of said container, and a conduit connecting said outlet of said unit to said discharge of said container, whereby water at said low water pressure in said container during treatment flows in sequence into said inlet of said unit, through said first, second and third water treatment media, through said outlet of said unit, through said conduit, and is discharged from said discharge of said container.

22. The water bottle of claim 3, wherein said container holds the water to be treated at said low water pressure, the container including a bottom, and a top having a discharge for discharging the water from the bottle, said water treatment unit being located adjacent the top of said container whereby the water at said low water pressure in said container during treatment flows in sequence into said inlet of said unit, through said first and second water treatment media, through said outlet of said unit, and is discharged from said discharge of the container.

23. The water bottle of claim 22, including an air vent adjacent the top of the container to equalize the pressure of the water in the container during treatment and bypassing said media.

24. The water bottle of claim 11, wherein said container holds the water to be treated at said low water pressure, the container including a bottom, and a top having a discharge for discharging the water from the bottle, said water treatment unit being located adjacent the top of said container whereby the water at said low water pressure in said container during treatment flows in sequence into said inlet of said unit, through said first, second and third water treatment media, through said outlet of said unit, and is discharged from said discharge of the container.

25. The water bottle of claim 24, including an air vent adjacent the top of the container to equalize the pressure of the water in the container during treatment and bypassing said media.

26. The water bottle of claim 11, wherein said third treatment medium though which the water to be treated flows during treatment comprises a particulate medium.

27. The water bottle of claim 3, wherein said container is constructed to be manipulated manually by squeezing to impart said low pressure to the water during treatment in said water treatment unit.

28. A water treatment unit for positioning in a container to treat water in the container which flows through the unit at low water pressure, the unit comprising:
   an elongate axis;
   an inlet for introducing water to be treated to the unit;
   a first chamber containing a first treatment medium which does not completely fill said first chamber when water is not flowing through the unit, said first treatment medium comprising a substantially loose particulate medium through which the water to be treated flows at low water pressure in a direction substantially parallel to said axis during treatment and which is lifted when the water flows through the unit at said low water pressure during treatment, and wherein said first treatment medium is one or more materials selected from the group consisting essentially of a metal alloy of copper and zinc, taicho and bakuhan;
   a second chamber containing a second treatment medium comprising a hollow block of carbon through which the water to be treated flows in a direction substantially perpendicular to said axis at said low water pressure during treatment;
   a third chamber containing a third treatment medium through which the water to be treated flows during treatment, and said third treatment medium includes a magnetic field;
   an outlet for discharging water which has been treated from the unit; and
   wherein the water flows from said inlet, though said first treatment medium, through said second treatment medium and from said outlet in that order and at said low water pressure during treatment.

* * * * *